(12) United States Patent
Knappenberger (10) Patent No.: US 9,331,549 B2
(45) Date of Patent: May 3, 2016

(54) THIN-WALLED HOUSING HAVING FORCE TRANSMISSION ELEMENTS THAT GUIDE COOLING FLUID

(71) Applicant: Robert Bosch GmbH, Stuttgart (DE)

(72) Inventor: Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 14/058,454

(22) Filed: Oct. 21, 2013

(65) Prior Publication Data

US 2014/0111043 A1 Apr. 24, 2014

(30) Foreign Application Priority Data

Oct. 19, 2012 (DE) .......................... 10 2012 219 120

(51) Int. Cl.
| | |
|---|---|
| H02K 9/00 | (2006.01) |
| H02K 15/14 | (2006.01) |
| H02K 5/04 | (2006.01) |
| H02K 5/20 | (2006.01) |

(52) U.S. Cl.
CPC .. *H02K 9/00* (2013.01); *H02K 5/04* (2013.01); *H02K 5/20* (2013.01); *H02K 15/14* (2013.01); *Y10T 29/49009* (2015.01)

(58) Field of Classification Search
CPC ........... H02K 15/14; H02K 9/00; H02K 5/04; H02K 5/20; H02K 5/08
USPC ............ 310/52, 12.33, 65, 154.15, 54, 58, 64
See application file for complete search history.

(56) References Cited

U.S. PATENT DOCUMENTS

| | | | | | |
|---|---|---|---|---|---|
| 3,508,092 | A | * | 4/1970 | Hallidy | ........................... 310/64 |
| 3,643,119 | A | * | 2/1972 | Lukens | ...................... 310/60 R |
| 3,863,083 | A | * | 1/1975 | Jaeschke | ......................... 310/52 |
| 4,375,292 | A | * | 3/1983 | Ericson | ......................... 277/371 |
| 4,894,573 | A | * | 1/1990 | Simpson | ............... 310/216.124 |
| 4,963,776 | A | * | 10/1990 | Kitamura | ....................... 310/64 |
| 6,223,538 | B1 | * | 5/2001 | Benz et al. | ..................... 60/753 |
| 6,281,607 | B1 | * | 8/2001 | Petach et al. | ................... 310/51 |
| 6,334,981 | B1 | * | 1/2002 | Wieres | ......................... 422/177 |
| 7,511,399 | B2 | * | 3/2009 | Lung et al. | ............. 310/216.055 |
| 2004/0113500 | A1 | * | 6/2004 | Casey et al. | ..................... 310/58 |
| 2005/0206252 | A1 | | 9/2005 | Georg et al. | |

FOREIGN PATENT DOCUMENTS

| | | | |
|---|---|---|---|
| CA | 2289997 | * 11/2004 | ............... B23K 9/32 |
| DE | 102004022557 | 12/2005 | |
| DE | 102006044785 | 4/2008 | |
| DE | 102007020372 | 11/2008 | |
| DE | 102008036124 | 2/2010 | |
| DE | 102010010395 | 6/2011 | |
| DE | 102010038529 | 2/2012 | |
| DE | 102010041586 | 3/2012 | |

* cited by examiner

*Primary Examiner* — Hanh Nguyen
(74) *Attorney, Agent, or Firm* — Michael Best & Friedrich LLP (57) ABSTRACT

A double-walled cooling housing (1) for an electrical machine (13). The cooling housing (1) comprises an inner housing (3), an outer housing (5) and a force transmission element (7). The outer housing (5) surrounds the inner housing (3). The force transmission element (7) is arranged between the inner housing (3) and the outer housing (5) and the force transmission element transmits forces that act on the inner housing (3) to the outer housing (5). Moreover, the force transmission element (7) guides cooling fluid between the inner housing (3) and the outer housing (5).

17 Claims, 7 Drawing Sheets

THIN-WALLED HOUSING HAVING FORCE TRANSMISSION ELEMENTS THAT GUIDE COOLING FLUID

BACKGROUND OF THE INVENTION

Electric machines, for example motors and generators, are used in numerous areas of technology. The electric machines comprise a stator and a rotor. The rotor and the stator are surrounded by a housing that is used to protect the electric machine.

Heat can be generated during the operation of the electric machine and said heat must then be dissipated. It is possible to provide a cooling arrangement on the housing. By way of example, electric machines having a cooled housing are known from DE 102004013133 A1 and DE 102010010395 A1.

In the case of fluid-cooled electric machines, the housings are embodied predominately as one part with a cooling channel. Alternatively, the housings for fluid-cooled electric machines can be embodied in two parts. The inner part of the housing can be embodied with a relatively thick wall in order to be able to support the cooling geometry.

It is possible to increase the external diameter of the housing by virtue of integrating the cooling arrangement in the housing, as a consequence of which expensive installation space is involved, for example in vehicles. Moreover, housings can comprise costly interfaces for the electric machine, for example to a stator iron core. Said interfaces can be associated with high labor costs during the production of the electric machine. Moreover, strong forces can act on the electric machine and/or on the housing in the region of these interfaces.

SUMMARY OF THE INVENTION

There can therefore be a demand for an improved cooling housing of a corresponding electric machine and a demand for a method for producing a cooling housing, which render it possible in particular to relieve the load on the interface between the cooling housing and the stator and/or the rotor of the electric machine and if necessary reduce the amount of installation space that is required for installing the electric machine.

Features, details and possible advantages of a device in accordance with embodiments of the invention are discussed in detail below.

In accordance with one aspect of the invention, a double-walled closed cooling housing for electric machines is proposed. The cooling housing comprises an inner housing and an outer housing. The outer housing surrounds the inner housing. At least one force transmission element is arranged between the inner housing and the outer housing. The force transmission element is embodied for the purpose of transmitting forces that act on the inner housing to the outer housing. Moreover, the force transmission element is embodied for the purpose of guiding cooling fluid between the inner housing and the outer housing.

In other words, the idea of the present invention is based on providing a thin-walled inner housing, for example from steel sheet, which inner housing is mounted on the outer housing by means of elastic force transmission elements. In addition to their force transmitting function, the force transmission elements are used to guide a cooling fluid inside the double-walled cooling housing. The double-walled cooling housing is embodied in three parts. In other words, the inner housing, the outer housing and the force transmission elements are manufactured separately in each case.

The inner housing can be of a thin-walled design by virtue of providing force transmission elements between the inner housing and the outer housing since the radial and tangential forces that act on the inner housing can be transmitted to the outer housing by way of the force transmission elements that are distributed around the periphery of the inner housing. As a consequence, it is possible to reduce the entire external diameter of the double-walled cooling housing. The force transmission elements position the electric machine and/or the stator together with the inner housing on the outer housing. The force transmission elements can absorb thermal deformations of the inner housing without having to provide additional strong forces.

A statistical mean position of the inner housing with respect to the outer housing is ensured by virtue of providing a high number of force transmission elements and/or by covering a large area by means of the force transmission elements on the periphery of the inner housing. In an advantageous manner, the individual force transmission elements that are arranged in the cooling housing can comprise a like and/or similar spring characteristic. Alternatively, the geometry of the force transmission elements can be optimized to suit the respective application. In this manner, a high level of accuracy can be ensured when positioning the electric machine with respect to the outer housing.

The force transmission elements can be used to guide the cooling fluid by virtue of the fact that the force transmission elements are embodied separately from the inner housing and the outer housing and the fact that the force transmission elements are positioned directly in the cooling fluid. For example, the flow can be guided in a meandering manner by virtue of the force transmission elements. This can be particularly advantageous in a region of the inner housing that is arranged on a coil end of the stator. Moreover, by virtue of embodying the force transmission elements separately, it is possible to adjust the cooling fluid flow in a variable manner to suit each application, in other words depending upon the respective electric machine. It is possible for this purpose to vary the number, geometry and positioning of the force transmission elements.

Moreover, it is possible by virtue of providing embossed areas at particular sites in the inner housing to achieve a positive locking arrangement, for example, with respect to a stator iron core, so that it is not necessary to provide a press fit for the purpose of transmitting the force. As a consequence, the internal stress in the stator pack and in the housing can be considerably reduced. This leads in turn to the stator deformations at the air gap being minimized.

Moreover, by virtue of using separately embodied force transmission elements, the double-walled cooling housing can be produced and mounted in a cost-effective manner.

The electric machine in which the double-walled cooling housing can be installed can be for example a motor or a generator of a motor vehicle, in particular of a hybrid or electric motor vehicle. For example, a rotor of the electric machine can be mounted in a rotatable manner in the stator. The double-walled cooling housing can surround the stator. The double-walled cooling housing can be embodied in a closed design for the purpose of guiding a cooling fluid, for example water, in a leak-proof manner.

The inner housing can be in particular a thin-walled steel housing, in particular a steel sheet. The inner housing can be used to provide a connection and to transmit heat between the stator and the cooling housing. The outer housing can provide corrosion protection both for the electric machine against external influences and also for surrounding components to protect them from the cooling fluid.

The force transmission element and/or several force transmission elements can be embodied for example as springs and/or spring pins or as a corrugated metal sheet. The force transmission elements ensure that radial force is transmitted and that the inner housing is positioned radially on the outer housing. Moreover, it is ensured that axial force is transmitted and that the inner housing is properly positioned by virtue of the end faces of the inner housing. The additional fluid guiding function of the force transmission elements on the periphery of the inner housing can be varied depending upon the embodiment of the electric machine. For example, the fluid can be redirected after each individual force transmission element or only after several elements. The flow can be guided for example in a meandering manner in the circumferential direction and/or in the axial direction of the electric machine.

In accordance with an exemplary embodiment of the invention, the inner housing comprises a wall thickness of between 0.5 and 3 mm. It is preferred that the wall thickness of the inner housing is between 0.5 and 1 mm. The inner housing is embodied as thinly as possible depending upon the electric machine so that it is nevertheless water-tight and provides protection against corrosion. In other words, the inner housing comprises a small as possible external diameter. The outer housing can comprise a wall thickness of 5 mm.

The cooling channel and the force transmission elements arranged in said cooling channel can comprise a dimension of 5 mm in the radial direction. By virtue of embodying the inner housing as a thin-walled metal sheet, it is possible to improve the transmission of the heat from the stator to the cooling fluid. Moreover, as a consequence, the entire external diameter of the cooling housing can be reduced, so that less installation space is required for the electric machine. Alternatively, additional installation space can be provided for the stator by virtue of the reduced thickness of the wall of the inner housing.

In accordance with a further exemplary embodiment of the invention, the cooling housing is embodied for the purpose of receiving a stator of an electric machine. The stator comprises material that has a first coefficient of thermal expansion. The inner housing comprises a material that has a second coefficient of thermal expansion. The first coefficient of thermal expansion differs from the second coefficient of thermal expansion by a maximum $50 \times 10^{-6} K^{-1}$.

It is preferred that the first coefficient of thermal expansion corresponds to the second coefficient of thermal expansion. The inner housing can comprise the same material as the stator. In particular, the inner housing can be produced from steel that has a coefficient of thermal expansion of $\alpha = 130 \times 10^{-6} K^{-1}$. Alternatively, the inner housing can be produced from stainless steel that has a coefficient of thermal expansion of $\alpha = 160 \times 10^{-6} K^{-1}$. Moreover, the inner housing can be produced from aluminum that has a coefficient of thermal expansion of $\alpha = 230 \times 10^{-6} K^{-1}$. The said coefficients of thermal expansion apply at a temperature of 20° C. By virtue of embodying the inner housing with a material that has a similar coefficient of thermal expansion to that of the stator, it is possible to minimize differences in thermal expansion in the gap between the cooling housing and the stator. As a consequence, it is possible to ensure a longer serviceable life of the cooling housing and of the electric machine.

In accordance with a further exemplary embodiment of the invention, the inner housing comprises steel and/or is produced from steel. Generally, the stator likewise comprises steel. Consequently, the coefficient of thermal expansion of the inner housing that is produced from steel is tailored in an optimum manner to suit the coefficients of thermal expansion. In particular, the inner housing can comprise stainless steel. The outer housing can comprise steel, stainless steel or aluminum.

In accordance with a further exemplary embodiment of the invention, the force transmission element can be embodied as a spring pin that has a C-shaped cross-section, O-shaped cross-section or S-shaped cross-section.

In accordance with a further exemplary embodiment of the invention, the force transmission element can be embodied as a corrugated metal sheet. The corrugated metal sheet can completely surround the inner housing or can be arranged only in particular regions of the outer periphery of the inner housing.

In accordance with a further exemplary embodiment of the invention, the force transmission element is connected to the inner housing by means of a positive material connection in such a manner that the force transmission element together with the inner housing forms a fluid-tight space for the cooling fluid. In other words, the force transmission element can be welded or soldered for example to the inner housing after the inner housing and the force transmission element have been produced separately. The positive connection by means of a material can be produced in particular at the edges of the inner housing. By virtue of embodying a fluid-tight space between the force transmission element and the inner housing, it is possible to omit additional sealing elements.

In accordance with a second aspect of the invention, an electric machine is proposed. The electric machine comprises a cooling housing as described above, a stator and a rotor. The stator comprises at least one coil end. The rotor is mounted in the stator in a rotatable manner. The stator is arranged in the cooling housing.

In accordance with a further exemplary embodiment of the invention, the coil end is thermally bonded to the inner housing. In particular, the coil end can be encapsulated. For example, the coil end can be encased in a resin. By virtue of encapsulating the coil end, it is possible to achieve an efficient thermal contact and consequently to improve the heat dissipation from the coil end to the inner housing.

In accordance with a further exemplary embodiment of the invention, a reinforcing element is provided on the inner housing in the region of the coil end and/or directly against the coil end. The reinforcing element is embodied for the purpose of absorbing forces that act in the axial direction of the stator. In other words, the reinforcing element provides strengthening in the axial direction. The external diameter of the inner housing is not increased with respect to the above mentioned exemplary embodiments since the reinforcing element is arranged in the space between the coil end and the inner housing.

In accordance with a third aspect of the invention, a method for producing a double-walled cooling housing for the above described electric machines is proposed. The method comprises the following steps:

providing an inner housing;
    providing an outer housing that is embodied for the purpose of receiving the inner housing; and
    arranging a force transmission element between the inner housing and the outer housing in such a manner that the force transmission element transmits forces that act on the inner housing to the outer housing;
    moreover, the force transmission element is embodied for the purpose of guiding a cooling fluid between the inner housing and the outer housing.

The inner housing can for example be produced from a steel sheet and the stator of the electric machine can be rolled up into the steel sheet. The ends of the steel sheet can be connected and welded. Subsequently, contact surfaces for the force transmission elements can be shaped for example as cutouts and/or embossed areas on the outer periphery of the inner housing.

The coil end can be optionally thermally bonded to the inner housing, for example by means of encapsulation. Moreover, O-rings or dispense sealing elements can be arranged on the inner housing. In a further step, force transmission elements that are embodied for example as spring pins can be positioned on the outer periphery of the inner housing. Subsequently, the stator, which is surrounded by the inner housing, together with the force transmission elements can be pressed into the outer housing. Subsequently, the outer housing can be closed by means of a cover, as a result of which it is ensured that the stator is fixed in the axial direction. Alternatively, the inner housing can be deep-drawn and pressed in. Half-shells that are welded and pressed in can be an additional alternative embodiment of the inner housing.

BRIEF DESCRIPTION OF THE DRAWINGS

Further features and advantages of the present invention are evident to the person skilled in the art from the description below of exemplary embodiments, which are however not to be regarded as limiting the invention, and with reference to the attached drawings, in which.

DETAILED DESCRIPTION

All the figures are merely schematic representations of devices in accordance with the invention and/or of their components in accordance with exemplary embodiments of the invention. In particular, spacings and size ratios are not represented in a true-to-scale manner in the figures. Corresponding elements are provided with like reference numerals in the different figures.

Figure 1:
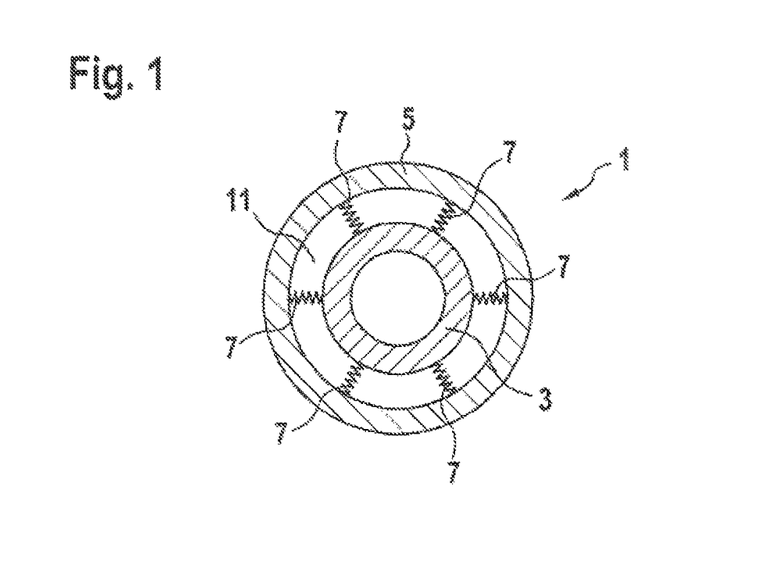
FIG. 1 illustrates a basic diagram of a cooling housing in accordance with an exemplary embodiment of the invention
Figure 2A:
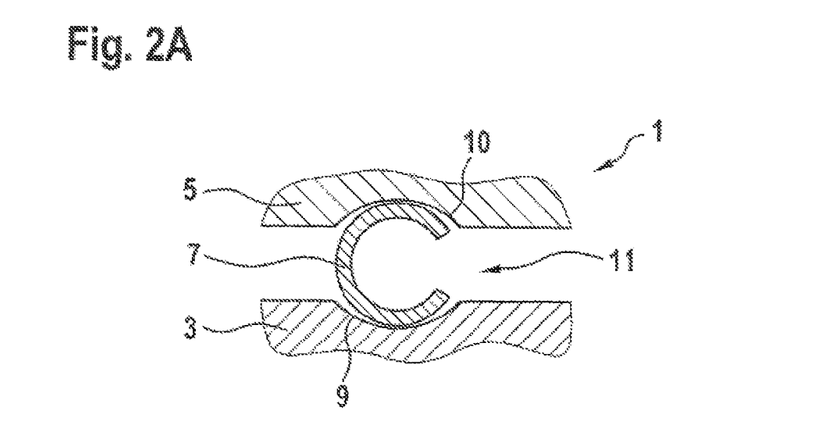
FIGS. 2A to 2D illustrate different embodiments of a force transmission element
Figure 2B:
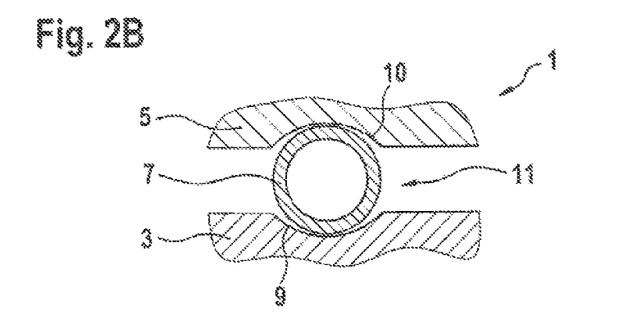
Figure 2C:
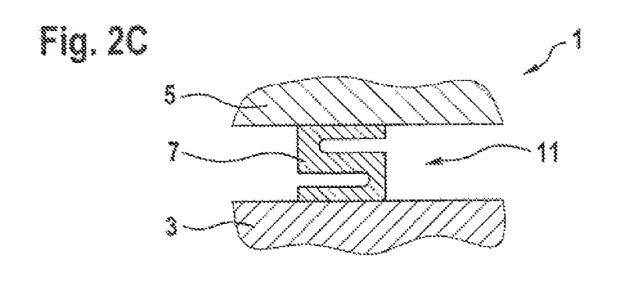
Figure 2D:
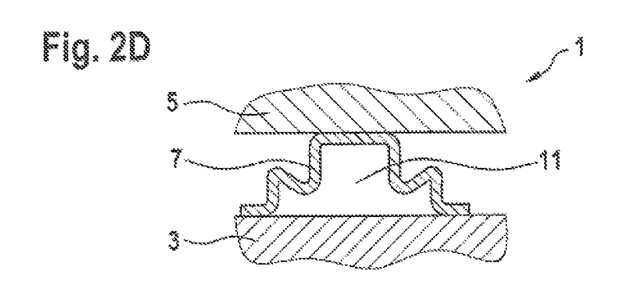

FIG. 1 illustrates a basic diagram of the double-walled cooling housing 1. The cooling housing 1 comprises an inner housing 3, an outer housing 5 and a plurality of force transmission elements 7. The force transmission elements 7 are distributed uniformly between the inner housing 3 and the outer housing 5 and function as springs. In addition to this function of transmitting force from the inner housing 3 to the outer housing 5, the force transmission elements 7 have a guiding function for guiding a fluid in the cooling channel 11 between the inner housing 3 and the outer housing 5.

FIGS. 2A-2D illustrate different embodiments of force transmission elements 7 in a cross-sectional view perpendicular to a longitudinal axis of the electric machine and/or of the cooling housing 1. In the exemplary embodiment in FIG. 2A, the force transmission element 7 comprises a C-shaped cross-section. In other words, the force transmission element can be embodied as an elastic tube that has a slit along the longitudinal axis of the tube. In the exemplary embodiment in FIG. 2B, the force transmission element 7 is embodied with an O-shaped cross-section. In other words, the force transmission element 7 can be embodied for example as a tubular spring pin. Moreover, in the exemplary embodiment in FIG. 2C, the force transmission element 7 is embodied with a S-shaped cross-section. In the exemplary embodiment in FIG. 2D, the force transmission element 7 is embodied as a corrugated metal sheet. Embossed areas 9, 10 can be provided both on the inner housing 3 and also on the outer housing 5 for the purpose of positioning the force transmission elements 7 more precisely between the inner housing 3 and the outer housing 5. This is illustrated for example in FIGS. 2A and 2B.

Figure 3:
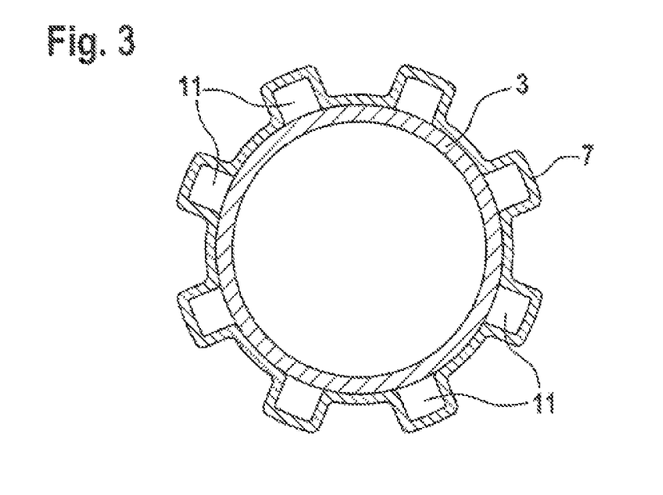
FIG. 3 illustrates a cross-sectional view of an inner housing with a force transmission element

FIG. 3 illustrates the inner housing 3 with a force transmission element 7 in a cross-sectional view parallel to the longitudinal axis of the housing and/or of the electric machine. The force transmission element 7 is embodied as a circumferential closed corrugated metal sheet. The force transmission element 7 together with the inner housing 3 forms the cooling channel 11.

Figure 4:
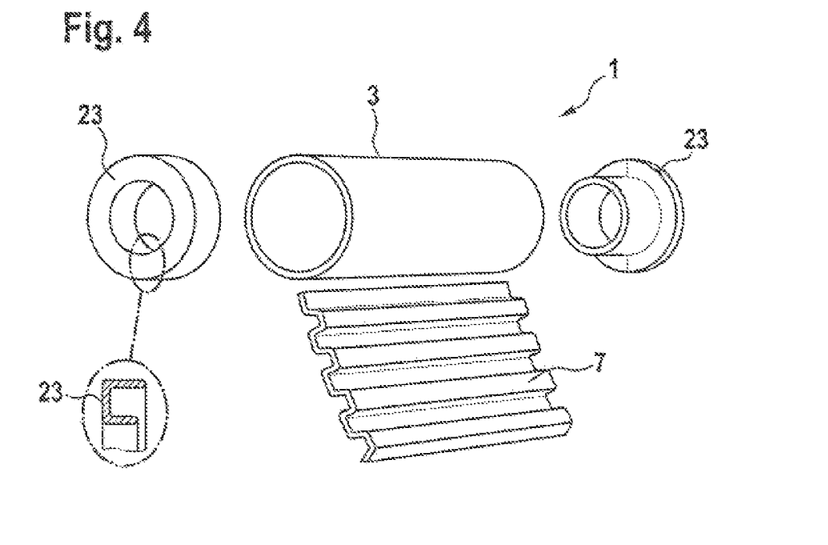
FIG. 4 illustrates an exploded view of a cooling housing in accordance with an exemplary embodiment of the invention without the outer housing

FIG. 4 illustrates an exploded view of the housing shown in FIG. 3. Reinforcing elements 23 also referred to as stiffening members can be provided on the ends of the tubular inner housing 3.

FIGS. 5 to 9 illustrate cross-sectional views parallel to a longitudinal axis 27 of an electric machine 13. The electric machine 13 comprises a stator 15 and a rotor 17. The rotor 17 is mounted in a rotatable manner in the stator 15. Moreover, the stator 15 comprises coil ends 19 that if necessary can be thermally bonded to the cooling housing 1 by means of an encapsulating mass 21. An encapsulating mass 21 is illustrated in the exemplary embodiments in FIG. 5 and FIG. 9. The cooling housing 1 is arranged about the stator 15. The inner housing 3 is located as close as possible and/or directly against the stator 15.

Figure 5:
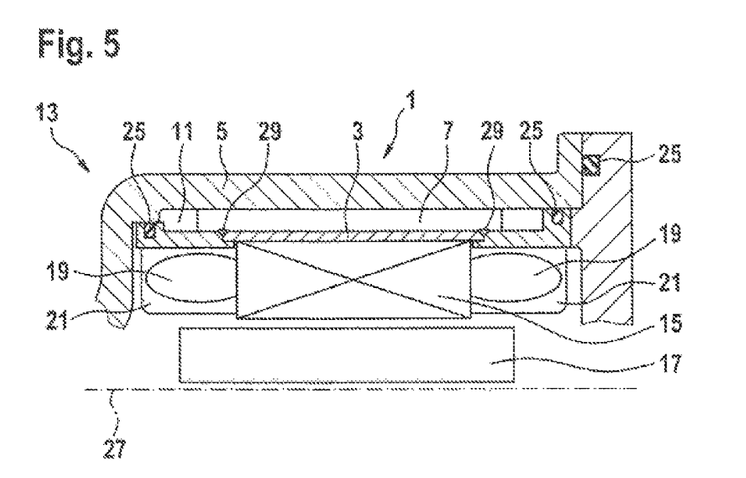
FIG. 5 illustrates a cross-sectional view through an electric machine in accordance with a first exemplary embodiment of the invention

In FIG. 5, the housing is embodied for example in three parts. In particular, one part of the inner housing 3 can lie directly against the stator 15. Two further parts of the inner housing 3 can in each case lie against an encapsulating 21 of the coil ends 19. Sealing elements 25 can be arranged between the individual parts of the inner housing 3. Moreover, additional sealing elements 25 can be provided between the inner housing 3 and the outer housing 5. Furthermore, the individual parts of the inner housing 3 can be mutually connected by means of a positive material connection at weld sites 29. The cooling fluid then flows in a tubular cooling channel 11 between the inner housing 3 and the outer housing 5, guided by means of force transmission elements 7.

Figure 6:
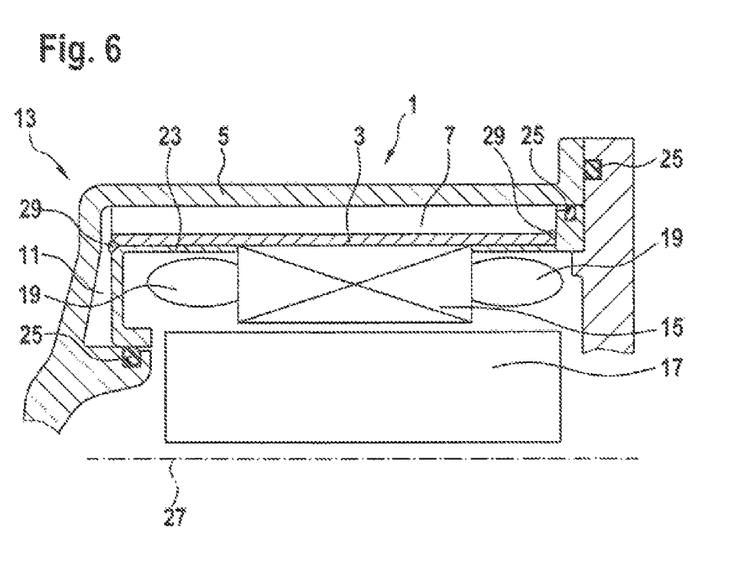
FIG. 6 illustrates a cross-sectional view through an electric machine in accordance with a second exemplary embodiment of the invention

In the exemplary embodiment in FIG. 6, the inner housing 3 is likewise embodied from three parts. One part of the inner housing 3 extends directly at the stator 15. Moreover, a further part of the inner housing 3 can overlap the first part of the inner housing 3 from the inside in part in the region of the coil end 19. As a consequence, axial accelerating forces can be better absorbed and onwards transmitted by way of the force transmission elements 7 to the outer housing 5. The outer diameter of the inner housing 3 is consequently not increased since the region at the coil end 19 is used for increasing the thickness of the inner housing 3. Moreover, in this manner the spacing between the coil end 19 and the inner housing 3 is minimized and the transmission of heat optimized. In addition, in the exemplary embodiment in FIG. 6 the fluid flow is guided around the peripheral surface of the inner housing 3 and radially inwards towards the coil end 19. In other words, the cooling channel 11 extends both in the axial direction and also in the radial direction at the coil end 19 and consequently provides more cooling area.

Figure 7:
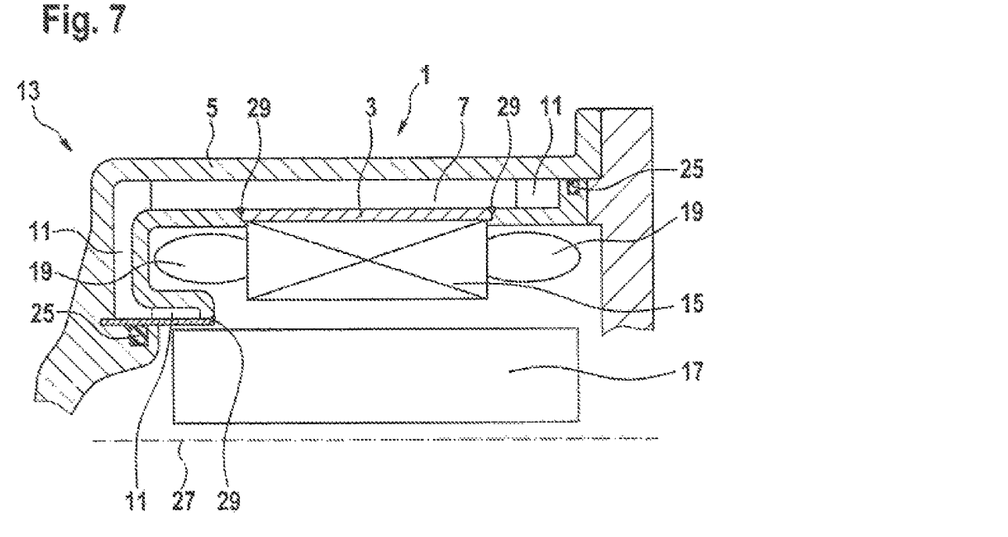
FIG. 7 illustrates a cross-sectional view through an electric machine in accordance with a third exemplary embodiment of the invention

FIG. 7 illustrates a further embodiment of the cooling housing 1. The inner housing 3 extends in addition to the regions illustrated in FIG. 6 also in the rotor chamber. In this manner, the cooling channel 11 can enclose the coil end 19 and in addition cool the rotor chamber. For this purpose, it is possible for example to provide a cooling rib on the inner housing 3 parallel to the rotor.

The inner housing 3 in the exemplary embodiment in FIG. 7 can be produced from four individual parts that are mutually welded or soldered at the sites 29. By way of example, the cooling rib that extends parallel to the rotor 17 can be embodied separately and subsequently welded to the inner housing 3.

Figure 8:
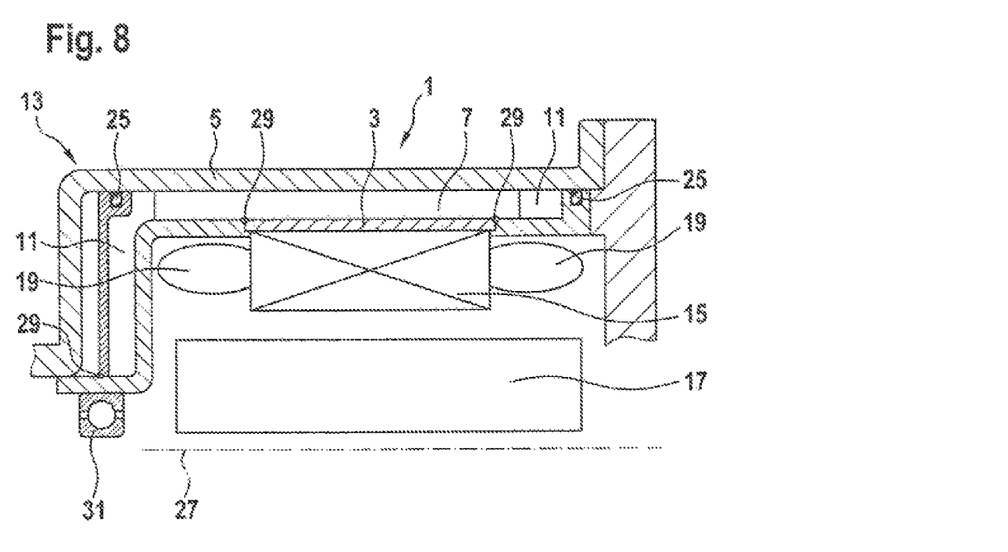
FIG. 8 illustrates a cross-sectional view through an electric machine in accordance with a fourth exemplary embodiment of the invention

In the exemplary embodiment in FIG. 8, the inner housing 3 is likewise embodied in four parts. The individual parts are mutually connected at the weld sites 29. The cooling channel 11 is routed in the radial direction at the coil end 19 and at the rotor 17. In this region, the inner housing 3 is embodied in a double-walled manner. Moreover, a ball bearing 31 is provided in the exemplary embodiment in FIG. 8. The inner housing 3 renders it possible in the embodiment illustrated in FIG. 8 to minimize the tolerances with respect to the ball bearing 31.

Figure 9A:
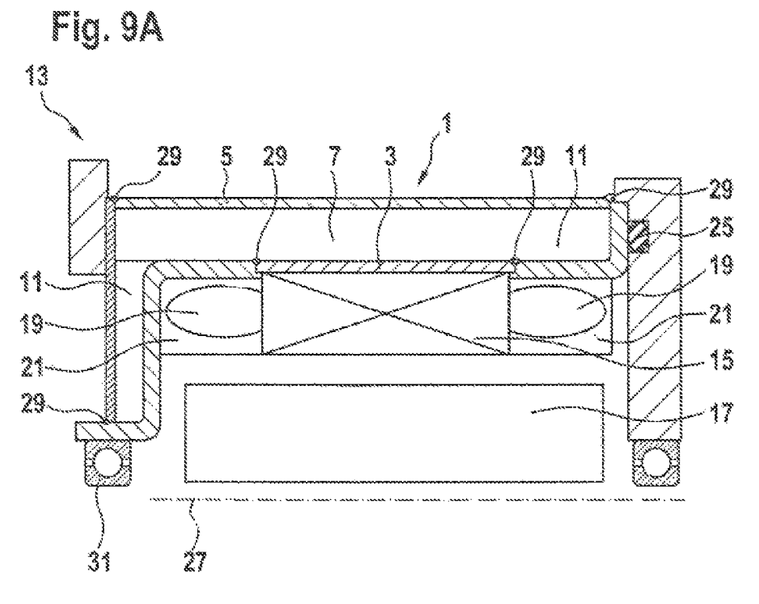
FIGS. 9A to 9C illustrate different views of an electric machine in accordance with a fifth exemplary embodiment of the invention
Figure 9B:
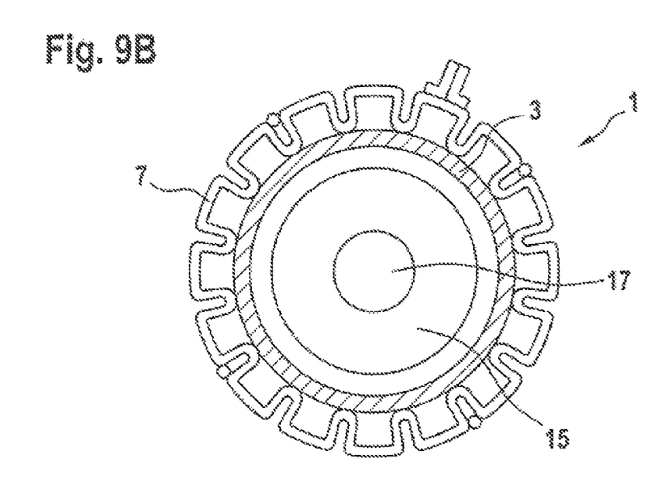
Figure 9C:
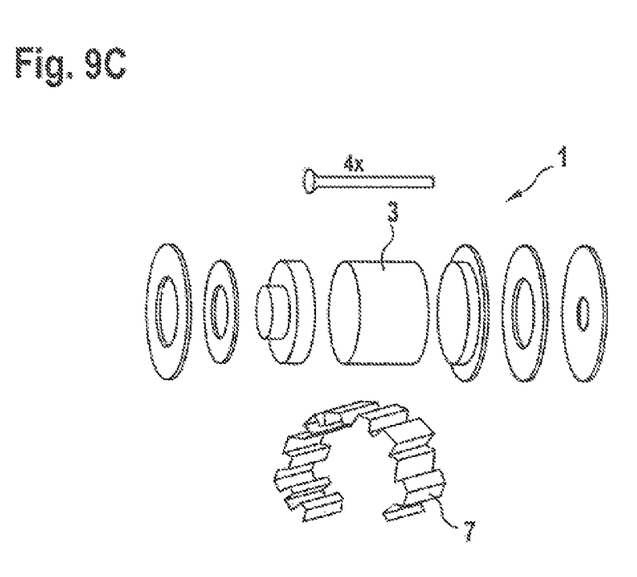

FIGS. 9A-9C illustrate an exemplary embodiment of the electric machine 13 in which the inner housing 3 is embodied completely in a double-walled manner. The force transmission element 7 is provided between the individual parts of the inner housing 3. The inner housing 3 can comprise five individually produced and mutually welded components. FIG. 9A illustrates a cross-sectional view of the corresponding electric machine 13 parallel to the longitudinal axis 27. FIG. 9B illustrates the electric machine 13 in a cross-sectional view perpendicular to the longitudinal axis 27. Moreover, FIG. 9C illustrates an exploded view of the inner housing 3 of the electric machine 13 shown in FIG. 9A.

Finally, it is to be noted that expressions such as "comprising" or similar are not intended to exclude that further elements or steps can be provided. Furthermore, reference is made to the fact that the term "one" does not exclude a plurality. Moreover, features that are described in connection with the different embodiments can be mutually combined in any desired manner. It is further noted that the reference numerals in the claims are not intended to have a limiting effect on the scope on the claims.

What is claimed is:

1. A double-walled cooling housing (1) for electric machines (13), the cooling housing (1) comprising:
    an inner housing (3);
    an outer housing (5) provided as a separate component from the inner housing (3), wherein the outer housing (5) surrounds the inner housing (3); and
    a force transmission element (7) between the inner housing (3) and the outer housing (5);
    wherein the force transmission element (7) transmits forces that act on the inner housing (3) to the outer housing (5);
    wherein the force transmission element (7) guides cooling fluid between the inner housing (3) and the outer housing (5); and
    wherein the force transmission element (7) is a spring pin that has a C-shaped cross-section, an O-shaped cross-section or an S-shaped cross-section.

2. The cooling housing (1) according to claim 1, wherein the inner housing (3) comprises a wall thickness between 0.5 and 3 mm.

3. The cooling housing (1) according to claim 1,
    wherein the cooling housing (1) is configured to receive a stator (15) of an electric machine (13);
    wherein the stator (15) comprises a material having a first coefficient of thermal expansion;
    wherein the inner housing (3) comprises a material having a second coefficient of thermal expansion; and
    wherein the first coefficient of thermal expansion differs from the second coefficient of thermal expansion by a maximum $50 \times 10^{-6} K^{-1}$.

4. The cooling housing (1) according to claim 1, wherein the inner housing (3) comprises steel.

5. The cooling housing (1) according to claim 1, wherein the force transmission element (7) is connected by a positive material connection to the inner housing (3) in such a manner that the force transmission element (7) together with the inner housing (3) forms a fluid-tight space for the cooling fluid.

6. An electric machine (13) comprising:
    a cooling housing (1) according to claim 1;
    a stator (15) having a coil end (19); and
    a rotor (17) that is mounted in a rotatable manner in the stator (15);
    wherein the stator (15) is arranged in the cooling housing (1).

7. The electric machine (13) according to claim 6, wherein the coil end (19) is thermally bonded to the inner housing (3).

8. The electric machine (13) according to claim 6,
    wherein a reinforcing element (23) is provided on the inner housing (3) in a region of the coil end (19); and wherein the reinforcing element (23) absorbs forces that act in an axial direction of the stator (15).

9. A method for producing a double-walled cooling housing (1) for an electric machine (13), the method comprising the following steps:
    providing an inner housing (3);
    providing an outer housing (5) as a separate component from the inner housing (3); and
    arranging a force transmission element (7) between the inner housing (3) and the outer housing (5) in such a manner that the force transmission element (7) transmits forces that act on the inner housing (3) to the outer housing (5);
    wherein the force transmission element (7) guides cooling fluid between the inner housing (3) and the outer housing (5); and
    wherein the force transmission element (7) is a spring pin that has a C-shaped cross-section, an O-shaped cross-section or an S-shaped cross-section, or the force transmission element (7) is a corrugated metal sheet.

10. A double-walled cooling housing (1) for electric machines (13), the cooling housing (1) comprising:
    an inner housing (3);
    an outer housing (5) provided as a separate component from the inner housing (3), wherein the outer housing (5) surrounds the inner housing (3); and a force transmission element (7) between the inner housing (3) and the outer housing (5);

wherein the force transmission element (7) transmits forces that act on the inner housing (3) to the outer housing (5);

wherein the force transmission element (7) guides cooling fluid between the inner housing (3) and the outer housing (5); and wherein the force transmission element (7) is a corrugated metal sheet.

11. The cooling housing (1) according to claim 10, wherein the inner housing (3) comprises a wall thickness between 0.5 and 3 mm.

12. The cooling housing (1) according to claim 10, wherein the cooling housing (1) is configured to receive a stator (15) of an electric machine (13);

wherein the stator (15) comprises a material having a first coefficient of thermal expansion;

wherein the inner housing (3) comprises a material having a second coefficient of thermal expansion; and wherein the first coefficient of thermal expansion differs from the second coefficient of thermal expansion by a maximum $50 \times 10^{-6} K^{-1}$.

13. The cooling housing (1) according to claim 10, wherein the inner housing (3) comprises steel.

14. The cooling housing (1) according to claim 10, wherein the force transmission element (7) is connected by a positive material connection to the inner housing (3) in such a manner that the force transmission element (7) together with the inner housing (3) forms a fluid-tight space for the cooling fluid.

15. An electric machine (13) comprising:

a cooling housing (1) according to claim 10;

a stator (15) having a coil end (19); and a rotor (17) that is mounted in a rotatable manner in the stator (15);

wherein the stator (15) is arranged in the cooling housing (1).

16. The electric machine (13) according to claim 15, wherein the coil end (19) is thermally bonded to the inner housing (3).

17. The electric machine (13) according to claim 15, wherein a reinforcing element (23) is provided on the inner housing (3) in a region of the coil end (19); and wherein the reinforcing element (23) absorbs forces that act in an axial direction of the stator (15).

* * * * *